United States Patent [19]

Kibler et al.

[11] 4,235,310
[45] Nov. 25, 1980

[54] AUTOMATIC ADJUSTER FOR HYDRAULICALLY ACTUATED DOUBLE DISC BRAKE

[75] Inventors: Robert L. Kibler, St. Joseph; Peter Wolf, Baroda, both of Mich.

[73] Assignee: Lambert Brake Corporation, St. Joseph, Mich.

[21] Appl. No.: 18,336

[22] Filed: Mar. 7, 1979

[51] Int. Cl.³ .............................................. F16D 65/74
[52] U.S. Cl. .................................. 188/71.5; 188/71.8; 188/72.7; 188/196 P
[58] Field of Search .................. 188/71.8, 71.5, 196 P, 188/72.7, 72.4, 72.8, 72.6

[56] References Cited

U.S. PATENT DOCUMENTS

| | | | |
|---|---|---|---|
| 3,371,750 | 3/1968 | Schutte et al. | 188/71.8 |
| 3,392,805 | 7/1968 | Kreitner | 188/71.8 |
| 3,722,637 | 3/1973 | Kershner | 188/196 P |
| 3,858,700 | 1/1975 | Kirschling | 188/71.8 X |
| 3,952,841 | 4/1976 | Pringle | 188/71.8 |
| 3,974,897 | 8/1976 | Pringle | 188/71.8 X |
| 4,030,576 | 6/1977 | Pringle | 188/71.8 |

Primary Examiner—Douglas C. Butler
Attorney, Agent, or Firm—Trexler, Wolters, Bushnell & Fosse, Ltd.

[57] ABSTRACT

A combination brake and brake wear take-up device is disclosed. The device comprises a disc brake assembly and a link assembly connected to actuator discs. A link assembly pull rod is connected to a fluid power piston slidably disposed in a cylinder. One or more conical washer members are carried around the piston and permit the piston to slide in the cylinder in one direction over a relatively extended distance, but permit the piston to slide in the opposite direction over only a limited distance. A snap ring disposed in the cylinder interior and a shoulder formed in the cylinder interior define the axial extent of that limited piston return motion.

12 Claims, 4 Drawing Figures

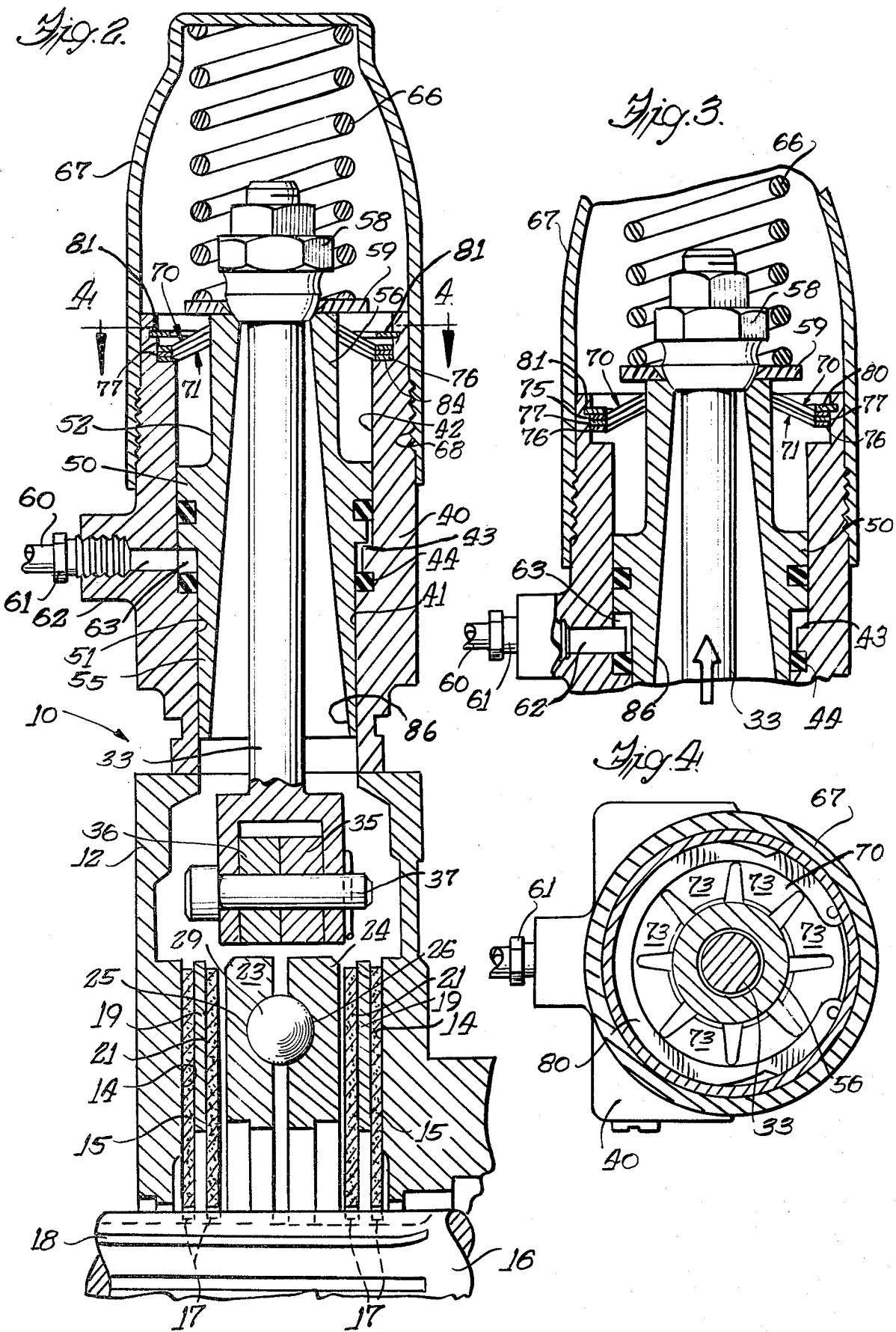

AUTOMATIC ADJUSTER FOR HYDRAULICALLY ACTUATED DOUBLE DISC BRAKE

BACKGROUND OF THE INVENTION

This invention relates generally to brakes, and more particularly concerns a novel combination brake and slack adjuster.

Adjustable brakes similar to the type disclosed in Kreitner U.S. Pat. No. 3,392,805 have met with considerable commercial success for a number of years. These reliable and relatively powerful brakes are relatively inexpensive and have found wide application on a wide variety of vehicles.

It is helpful to provide such a brake with means for automatically compensating or adjusting the brake device for wear of the brake friction surfaces. One such device is disclosed in Kershner U.S. Pat. No. 3,722,637.

It is the general object of the present invention to provide a relatively inexpensive and compact, yet reliable and rugged slack adjuster mechanism in combination with a disc brake unit.

Other objects and advantages of the invention will become apparent from the following description and upon reference to the drawings. Throughout the drawings, like reference numerals refer to like parts.

BRIEF DESCRIPTION OF THE DRAWINGS

FIG. 2 is a sectional view taken substantially in the plane of line 2—2 in FIG. 1;

FIG. 3 is a fragmentary sectional view similar to FIG. 2 and showing the slack adjuster mechanism as it appears when slack has been taken up in the brake unit; and FIG. 4 is a sectional view taken substantially in the plane of line 4—4 in FIG. 2.

DETAILED DESCRIPTION

Figure 1:
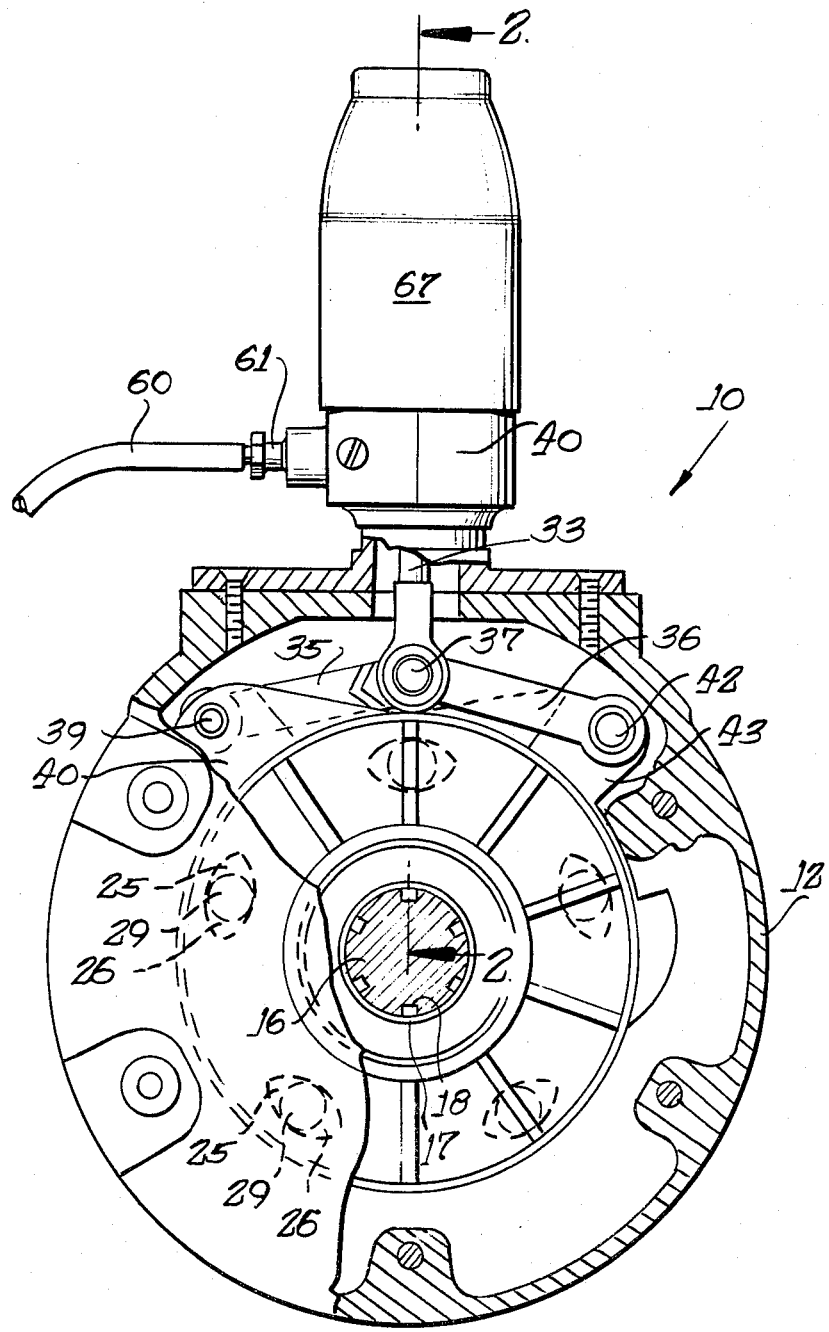
FIG. 1 is an end elevational view in partial section showing the brake unit and slack adjuster.

While the invention will be described in connection with a preferred embodiment, it will be understood that it is not intended to limit the invention to that embodiment. On the contrary, it is intended to cover all alternatives, modifications and equivalents as may be included within the spirit and the scope of the invention as defined by the appended claims.

Turning more specifically to the drawings, there is shown a novel combination brake assembly and slack adjuster 10 embodying the present invention. This unit 10 includes a housing 12 which can be fixed to the frame or body of the vehicle by appropriate means (not shown). Opposed friction surfaces 14 are presented within the housing 12.

Immediately adjacent the housing friction surfaces 14, rotor discs 15 are mounted to a rotatable shaft 16. The rotor discs 15 are secured to the shaft 16 by teeth 17 and spline grooves 18 of known construction to cause the rotors 15 to turn with the shaft 16 yet to allow the rotors to move axially on the shaft. To frictionally engage these rotor discs 15, stator discs 19 are held within the housing 12 for axial but non-rotational motion by pin mounting devices (not shown) as explained, for example, in the above-mentioned U.S. Pat. No. 3,722,637. Other arrangements for folding the stator discs 19 for axial but non-rotational motion in the housing are known as indicated, for example, in U.S. Pat. No. 3,010,542.

Adjacent these stator discs 19, additional rotor discs 21 are mounted to the shaft 16 by spline structures 17 and 18 similar to that used to mount the previously-discussed rotor discs 15. It will be understood that additional rotor discs and stator discs can be mounted within the brake housing 12 in this interleaved manner to provide additional braking action if desired.

Adjacent the inner rotor discs 21, actuating discs 23 and 24 are each formed with an annular series of opposed, oppositely extending, inclined, generally conical ball seats and cam surfaces 25 and 26. Ball elements 29 are disposed between these pairs of surfaces 25 and 26. When the brake unit is to be energized, the actuating discs 23 and 24 are rotated about the shaft 16 in opposite directions. In this way, the ball elements 29 are caused to ride up on higher portions of the cam surfaces 25 and 26. This action forces the actuating discs 23 and 24 axially away from each other along the shaft 16 and into frictional engagement with the immediately adjacent rotor discs 21. These rotor discs 21 are, in turn, urged into frictional engagement with the stator discs 19; the stator discs 19 engage the adjacent rotor discs 15 which are urged into engagement with the friction surfaces 14 on the housing 12. Thus, these disc packs or stacks 15, 19 and 21 are squeezed into frictional, braking engagement.

This actuating disc rotation is caused by a pull rod 33. When the pull rod 33 is urged upwardly, as suggested in FIGS. 1 and 2, drag link members 35 and 36, connected to the pull rod 33 by a link pin 37, are dragged centrally and upwardly. Now, drag line 35 is connected by a pin 39 to an ear 40 affixed to one actuating disc 23, and drag link 36 is connected by a pin 42 to an ear 43 affixed to the opposite drag link 24. When these ears 40 and 43 are rotated centrally, by the link assembly 33, 35, 36, as can be envisioned in FIG. 1, the corresponding actuating discs 23 and 24 are rotated oppositely to one another so as to be cammed axially and provide the braking action described above.

The pull rod 33 is operated by a fluid power piston and cylinder arrangement. As especially shown in FIGS. 2 and 3, a hydraulic cylinder 40 is formed with a first surface 41 of relatively small radius and a second surface 42 of larger radius. Adjacent an annular shoulder 43, a seal member 44 is carried to discourage hydraulic leakage. A piston 50 is formed with a first annular surface 51 of relatively extended diameter to mate with the first cylinder surface 41. A second cylinder surface 52 of relatively small diameter is spaced apart from the second cylinder surface 42. In carrying out the invention, this arrangement provides good guiding action for the piston 50 in the cylinder 40 at the piston lower end 55, yet provides clearance or free space for the piston 50 at the piston upper end 56.

The pull rod 33 is connected to the piston 50 adjacent the piston upper end 56. Here, this interconnection is provided by a nut 58 threaded to the rod 33. A washer member 59 provides a good bearing interconnection between the nut 58 and the piston upper portions 56.

When brake energization is desired, pressurized fluid is introduced to the unit through an appropriate conduit 60, a fitting 61 and a passage 62 to an annular chamber 63. By comparing FIGS. 2 and 3, it will be observed that the continued addition of fluid to the chamber 63 forces the piston 50 in an upward direction.

To de-energize the brake, fluid in the chamber 63 and communicating portions of the brake system is de-pressurized. A biased return device, here taking the form of a coil spring member 66, urges the piston 50 downwardly from the position shown in FIG. 3 to the position shown in FIG. 2. In the illustrated embodiment, this spring member 66 is compressed between the head washer 59 and a cap 67 secured, as by threads 68, to the cylinder 40.

As brake use continues, the brake disc elements 15, 19 and 21 wear in a normal manner. As a result, over an extended period of time, it would be necessary to pull upwardly the brake pull rod 33 to an increasing extent to provide a given amount of braking action. But in accordance with the invention, the present unit adjusts upwardly the position of the pull rod 33 as brake wear occurs. To accomplish this, one or more annular, generally conical gripping members 70, 71 are provided with a series of inclined inwardly extending prongs or finger members 73 which press against and engage the upper surface 52 of the piston 50. These conical washer members 70 and 71 terminate at their outer peripheries in generally disc-like flat base portions 75 and 76. To provide free action to the fingers 70 and 71, a disc spacer washer member 77 is interposed between these bases 75 and 76.

As the piston 50 is urged upwardly, these cone members 70 and 71 ride upwardly with the piston until they engage a stop device such as a snap ring 80 mounted in an appropriate recess 81 formed in the wall of the cylinder 40. The orientation of these members 70 and 71 permits the upper piston surface 52 to slide relatively freely through the prong members 73 in an upward direction as indicated in FIGS. 2 and 3. When the piston 50 is returned towards its original position in a downward direction, however, the prongs 73 tightly grip the piston surface 52, and as the descending conical members 70 and 71 seat upon a stop such as a mating cylinder shoulder 84, the piston 50 is prevented from moving further downwardly. Under these circumstances, the piston 50 and the carried pull rod 33 are maintained in a relatively extended position to compensate for the wear which has occurred within the brake unit. Further incremental amounts of brake wear will permit corresponding incremental upward adjustment of the piston 50 and brake pull rod 33 so as to maintain the brake unit 10 in a relatively slack-free configuration.

It will be apparent that, in constructing this device, the snap ring 80 and the cylinder shoulder 84 should be spaced apart sufficiently to permit the pull rod 33 and carried conical members 70 and 71 to move between a brake free-running, de-energized and a brake fully energized position without slack take-up action occurring.

Experience has shown that, as braking action occurs, at least some brake parts within the housing 12 tend to rotate, or "clock" about the shaft 16. This action tends to cant the pull rod 33. To avoid damaging the pull rod against the piston 50 under these circumstances, an inner piston surface 86 can be given a generally conical configuration.

The invention is claimed as follows:

1. A brake and brake wear take-up device, comprising, in combination, brake disc means disposed about a rotatable shaft for applying braking action to the shaft, actuator discs carried for selectively axially engaging the brake disc means and which, when rotated and axially shifted, positively engage the brake disc means and energize the brake, a link assembly connected to the actuator discs for shifting the actuator discs, a walled cylinder, a piston slidable in the cylinder and having a first large radius surface for engaging the cylinder wall and a second small radius surface concentric with but spaced apart from the cylinder wall, a conical member mounted for limited axial motion relative to the cylinder, the conical member engaging the piston second surface to permit the piston to move through the conical member in a first direction, but to inhibit piston motion through the conical member in an opposite direction.

2. A brake and brake wear take-up device according to claim 1 including biasing means for urging the piston to move in said opposite direction.

3. A brake and brake wear take-up device according to claim 1 wherein said conical member is provided with a base portion, and wherein said cylinder is provided with a shoulder portion for abuttingly engaging said base portion, the combination further including a stop means mounted to the cylinder at a point axially spaced apart from the cylinder shoulder so as to permit the conical member to undergo limited axial motion between the cylinder shoulder and the stop means.

4. A brake and brake wear take-up device according to claim 3 wherein said stop means includes a snap ring.

5. A brake and brake wear take-up device according to claim 1 including a plurality of conical washer members.

6. A brake and brake wear take-up device comprising, in combination, stator disc means disposed about a rotatable shaft, rotor disc means mounted for rotation with the shaft and interleaved among the stator disc means, actuator discs carried between the stator and rotor disc means for axially shifting into engagement with the stator and rotor disc means so as to energize the brake upon shifting of the actuator discs, a link assembly connected to the actuator discs for shifting the actuator discs, a walled cylinder, a piston slidable in the cylinder and having a first large radius surface for engaging the cylinder wall and a second small radius surface concentric with but spaced apart from the cylinder wall, a conical member mounted for limited axial motion relative to the cylinder, the conical member engaging the piston second surface to permit the piston to move through the conical member in a first direction, but to inhibit piston motion through the conical member in an opposite direction.

7. A brake and brake wear take-up device according to claim 6 including a plurality of conical members.

8. A brake and brake wear take-up device according to claim 7 including at least one washer spacer member carried between adjacent conical members.

9. A brake and brake wear take-up device according to claim 6 wherein said link assembly includes a pull rod member extending through said piston.

10. A brake and brake wear take-up device according to claim 9 wherein said link assembly includes at least one drag link means connected between said pull rod and an actuator disc.

11. A brake and brake wear take-up device according to claim 9 wherein said piston is partially defined by a conical inner surface at least partially surrounding the pull rod.

12. A brake and brake wear take-up device, comprising, in combination, brake disc means disposed about a rotatable shaft for applying braking action to the shaft, actuator discs carried for selectively axially engaging the brake disc means and which, when rotated and axially shifted, positively engage the brake disc means and energize the brake, a link assembly connected to the actuator discs for rotating the actuator discs and causing the actuator disc axial shifting, cylinder means, a piston slidably disposed within the cylinder means and connected to the link assembly, wear take-up means including a conical washer member disposed around the piston so as to permit the piston to slide in the cylinder in one direction over a relatively extended distance, but to permit the piston to slide in the cylinder in the opposite direction over only a limited distance, the cylinder defining a cylinder shoulder adapted to engage the conical washer member as the piston moves toward an original, brake-disengaged position, and a snap ring mounted in and on the cylinder wall at a position spaced from the cylinder shoulder and adapted to engage the conical washer member as the piston moves toward a brake-engaged position.

* * * * *